(12) United States Patent
McCall et al.

(10) Patent No.: US 9,415,648 B2
(45) Date of Patent: Aug. 16, 2016

(54) HITCH ASSEMBLY FOR TRUCK FRAME WITH INTEGRATED HITCH MOUNTING STRUCTURE

(71) Applicant: B & W Custom Truck Beds, Inc., Humboldt, KS (US)

(72) Inventors: Travis M. McCall, Humboldt, KS (US); Nelson Borror, Chanute, KS (US); Brent Luedke, Colony, KS (US)

(73) Assignee: B & W CUSTOM TRUCK BEDS, INC., Humboldt, KS (US)

( * ) Notice: Subject to any disclaimer, the term of this patent is extended or adjusted under 35 U.S.C. 154(b) by 0 days.

(21) Appl. No.: 14/279,450

(22) Filed: May 16, 2014

(65) Prior Publication Data
US 2014/0339791 A1 Nov. 20, 2014

Related U.S. Application Data

(60) Provisional application No. 61/823,958, filed on May 16, 2013.

(51) Int. Cl.
*B60D 1/06* (2006.01)
*B60D 1/48* (2006.01)

(52) U.S. Cl.
CPC *B60D 1/485* (2013.01); *B60D 1/06* (2013.01); *B60D 1/488* (2013.01)

(58) Field of Classification Search
CPC ........................................................ B60D 1/485
USPC ........................................................... 280/495
See application file for complete search history.

(56) References Cited

U.S. PATENT DOCUMENTS

| | | | |
|---|---|---|---|
| 4,546,994 A * | 10/1985 | Taylor | 280/423.1 |
| 5,246,244 A | 9/1993 | Colibert | |
| 5,472,222 A | 12/1995 | Marcy | |
| 6,158,761 A | 12/2000 | King | |
| 6,199,890 B1 | 3/2001 | Lindenman et al. | |
| 6,409,202 B1 * | 6/2002 | Putnam | 280/495 |
| 6,520,528 B2 * | 2/2003 | Fandrich et al. | 280/496 |
| 6,695,338 B1 | 2/2004 | Roberts | |
| 6,805,379 B2 | 10/2004 | Nommensen | |
| 6,969,090 B1 | 11/2005 | Works | |
| 7,775,541 B2 | 8/2010 | Linger et al. | |
| 7,793,968 B1 | 9/2010 | Withers | |
| 7,828,317 B2 | 11/2010 | Withers et al. | |
| 8,414,009 B2 | 4/2013 | Stanifer et al. | |
| 2009/0295122 A1 * | 12/2009 | Withers et al. | 280/476.1 |
| 2013/0113180 A1 | 5/2013 | McCoy et al. | |
| 2014/0312596 A1 | 10/2014 | Mida et al. | |

* cited by examiner

*Primary Examiner* — Joseph Rocca
*Assistant Examiner* — Felicia L Brittman
(74) *Attorney, Agent, or Firm* — Erickson Kernell IP, LLC

(57) ABSTRACT

An after-market hitch assembly is provided for securing to a cross member of a truck which is specifically adapted for securing a hitch assembly thereto prior to installation of the truck bed. The after-market hitch assembly adapted for securing to the hitch frame after installation of the truck bed without having to remove the truck bed.

12 Claims, 6 Drawing Sheets

HITCH ASSEMBLY FOR TRUCK FRAME WITH INTEGRATED HITCH MOUNTING STRUCTURE

CROSS REFERENCE TO RELATED APPLICATION

This application claims the benefit of provisional patent application Ser. No. 61/823,958, filed May 16, 2013.

BACKGROUND OF THE INVENTION

1. Field of the Invention

This invention relates to a hitch assembly for mounting to a truck frame with an integrated hitch mounting structure or panel and a method of installing a hitch to such a frame without removing the truck bed.

2. Description of the Related Art

Hitch assemblies have been developed for securing a hitch ball in the bed of a pick-up or flat bed truck to which a gooseneck of a trailer may be attached. U.S. Pat. No. 5,016,898 assigned to B&W Custom Truck Beds, Inc. discloses such a hitch assembly with a hitch ball retention sleeve welded to a base frame which is then connected to the frame members of the vehicle beneath a hole cut through the load bed so that a hole in the retention sleeve aligns with the hole through the load bed. The hitch ball has a base or stem which can be inserted through the hole in the load bed and into the retention sleeve. A pin is used to secure the hitch ball stem in the retention sleeve.

Truck manufacturers have recently introduced trucks having frames with integrated structure to which a hitch base or hitch assembly may be secured without having to modify the truck frame to do so. Referring to FIG. 1, a frame cross member 10 is shown for a Dodge® or Ram® truck which extends below a truck bed floor 11. The frame cross member 10 is mounted between the longitudinal rails (not shown) of the truck frame with the rails received within horizontal and longitudinally extending recesses or receivers 12 formed on the end of the frame cross member 10 between upper and lower mounting flanges 13 and 14. The frame cross member 10 is formed as a C-shaped channel member 16 having depending front and rear legs or side walls 17 and 18 and an interconnecting web 20 which extends in closely spaced relation below the truck bed floor 11. The web 20 includes a central support panel 22 extending between upper ends of the side walls 17 and 18 and downwardly recessed outer support panels 23 and 24. The upper mounting flanges 13 project outward from ends of the channel member 16 and each lower flange 14 is spaced below a respective upper flange 13 by front and rear gussets 26 and 27 projecting downward from the side walls 17 and 18 of the channel member 16.

A hitch member receiving hole 31 is formed in and extends through the central support panel 22. The hole 31 is sized larger than the width or diameter of a ball type hitch member 32 having a hitch ball head 33 and a hitch ball base or stem 34 such that the hitch member 32 may be passed through the receiving hole 31. A plurality of mounting holes 36 are formed in the web 20 around the hitch member receiving hole 31. In the embodiment shown, the mounting holes 36 are formed through the recessed outer support panels 23 and 24. Three holes 36 are formed on each side of the hitch member receiving hole 31. The holes 36 in each set of three holes 36 extend in equally spaced alignment relative to one another and the centers of each set of three holes 36 extend in linear alignment at an angle relative to a longitudinal axis extending through the hitch member receiving hole 31. The holes 36 are adapted to receive bolts for bolting a hitch assembly to the frame cross member 10.

The frame cross member 10 is adapted to permit installation of a hitch assembly during assembly of the truck or afterwards. When a hitch assembly is installed during assembly, bolts may be readily inserted through the web 20 before the truck bed is attached to the frame with the stem of each bolt extending downward through a respective hole in the outer support panel 23 or 24 and through aligned bolt holes in a hitch assembly positioned therebelow with nuts then secured on the end of the bolts below the hitch assembly and the heads of the bolts supported on the respective support panel 23 or 24. It is also known to connect the bolts together with a strap welded between the bolt heads. The outer support panels 23 and 24 are recessed downward relative to the central support panel 22 to provide space below the truck bed floor 11 to receive the heads of the bolts.

Installing a hitch assembly after the truck has been assembled has proven difficult without first removing or at least partially raising the truck bed off of the frame to allow bolts to be inserted through the mounting holes 36 with the heads of the bolts above the support panels 23 and 24 and a nut secured to each bolt below the hitch assembly. The gap formed between the truck bed floor 11 and the downwardly recessed outer mounting panels 23 and 24 is too small or narrow relative to the head of a an appropriately sized bolt to permit inserting the bolt generally horizontally through the gap, which is open along the outer ends of outer mounting panels 23 and 24, and then rotating the bolt ninety degrees to pass the stem of the bolt downward through one of the bolt holes 36. In addition, it is extremely difficult for an installer to insert the stem of a bolt up through the hitch assembly and one of the bolt holes 36 in the cross-member 10 while trying to position a nut in line over the bolt hole 36 to readily permit threading of the bolt upward through the nut without first removing the bed. Therefore, known hitch installation methods or instructions typically recommend first removing the truck bed from the frame.

Removing a truck bed from the truck frame to permit attachment of a hitch assembly to the frame is not desirable. Doing so increase the risk of damaging sensitive structure or equipment including the fuel fill neck, fuel lines, portions of the exhaust system, the wiring harness, hoses, vents and the fuel pump. The installation process may also result in damage to the cab. The process of removing the bed is time consuming and therefore adds to the cost of installing a hitch assembly. Due to the substantial weight of the truck bed, efforts to remove the bed increase the risk of the installer suffering an injury resulting in greater risk of workers compensation claims and added costs to the installer.

The construction of the frame cross-member 10 also presents obstructions, such as gussets 26 and 27, which limit the ability to readily adapt existing hitch assemblies to the cross member 10.

SUMMARY OF THE INVENTION

A trailer hitch assembly is provided for use in combination with a vehicle having a bed floor and a frame having a cross member closely spaced below the bed floor. The cross member includes a plurality of first mounting holes formed therethrough for use in attaching a trailer hitch assembly to the cross member. The trailer hitch assembly comprises a hitch body positionable below the cross member and includes a plurality of second mounting holes formed therethrough. Each of the second mounting holes is positioned to be aligned with a respective one of the first mounting holes in the cross member. The hitch assembly further includes at least one nut plate sized to be inserted between the bed floor and the cross member of the vehicle and including a plurality of threaded bolt receivers. Each of the threaded bolt receivers is positioned to be aligned with a respective one of the first mounting holes in the cross member. A plurality of threaded fasteners are then receivable through respective aligned pairs of first and second mounting holes and threadably engagable with the respective threaded bolt receiver aligned therewith.

The nut plate preferably includes a locating feature positioned to engage a preselected feature of the cross-member in order to position said threaded bolt receivers proximate to and in general alignment with the respective first mounting holes. The locating feature may be located on an arm extending outward from the nut plate with the locating feature adapted to engage existing structure on or holes formed in the cross member. Engagement of the locating feature on the arm with a complimentary feature on the cross member further acts to resist a torque applied to tighten one of the threaded fasteners in order to inhibit the nut plate from rotating along with the one threaded fastener.

The trailer hitch assembly further incorporates a spring biased latch pin assembly for securing a hitch member in a socket or retention sleeve of the hitch body which is configured to operate within the confined space available. The cross member to which the hitch assembly is mounted includes a hitch ball opening proximate a midline of the bed floor. The hitch member includes a base having a latch pin receiver formed therethrough and a hitch ball head. The latch pin receiver is positioned for alignment with a passageway in the socket. The latch pin receiver and the passageway slidably receive a latch pin moveable between an engaged position wherein the hitch member is retained in the socket and a disengaged position where the hitch member is freely removable from the socket.

A latch pin linkage is connected to the latch pin and includes an actuator arm positioned parallel to and spaced apart from the latch pin. A compression spring is positioned around the actuator arm and captured between a mounting flange or stop affixed to the hitch body and a retainer secured on a distal end of the actuator arm. The spring acts against the retainer and the stop to urge the latch pin toward an engaged position. A lever arm connects the actuator arm to the latch pin.

A handle is connected to the latch pin for drawing the latch pin toward the disengaged position against the urging of the spring. The latch pin is supported on and slidably mounted relative to a latch pin mount or mounting tab. A notch formed in the latch pin is pivoted into overlapping relationship with the latch pin mount to hold the latch pin in a disengaged position when the latch pin is withdrawn from the latch pin receiver in the hitch member against the biasing force of the spring. The latch pin is pivoted to advance the notch over the mounting tab due to a moment created by the spring acting through the lever arm.

DETAILED DESCRIPTION OF THE PREFERRED EMBODIMENTS

Figure 1:
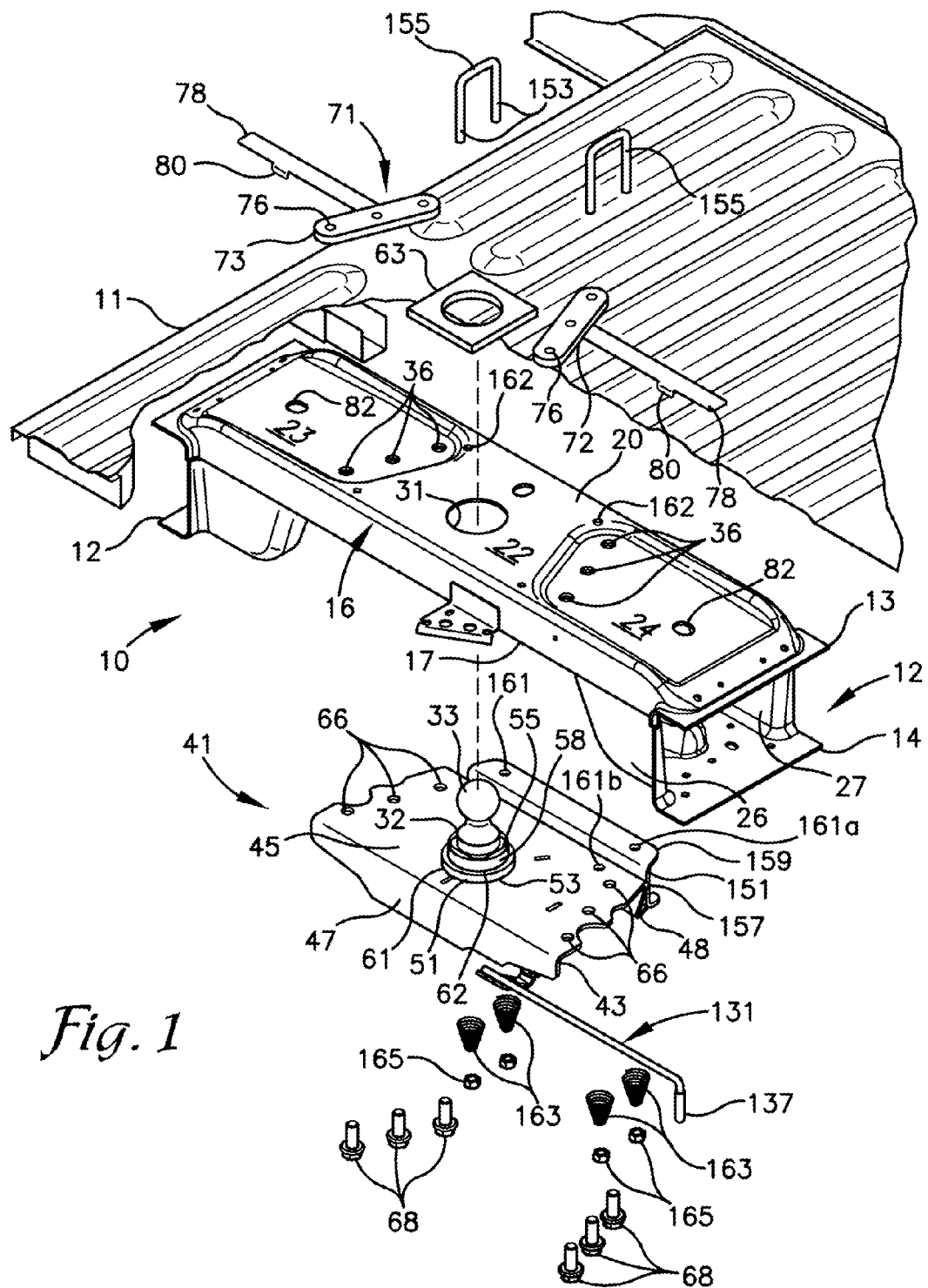
FIG. 1 is an exploded, fragmentary perspective view of a hitch assembly secured to a frame cross member below the floor of a truck bed.
Figure 2:
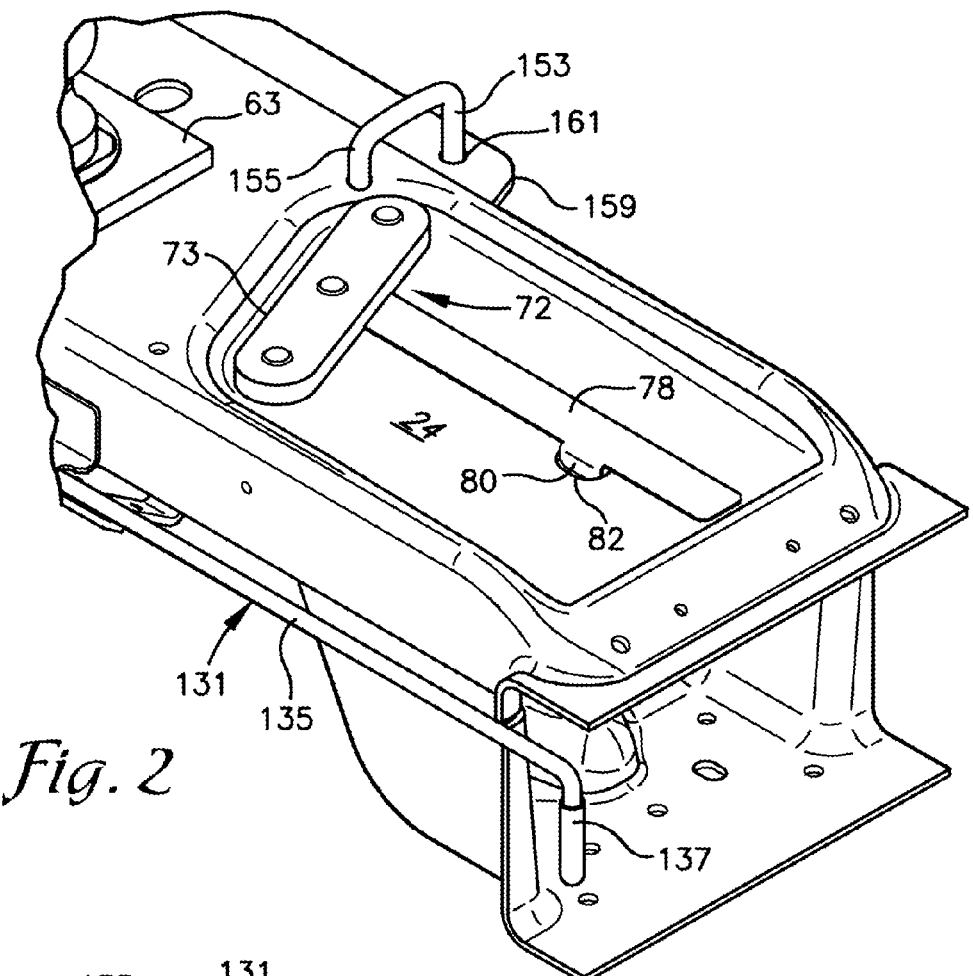
FIG. 2 is a greatly enlarged fragmentary perspective view of the frame cross member with the hitch assembly secured thereto.
Figure 3:
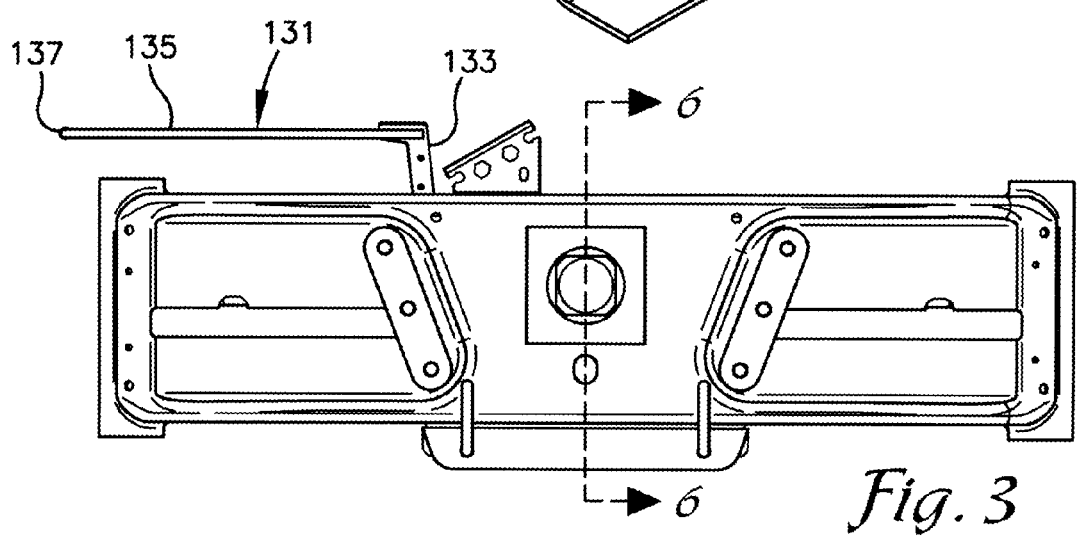
FIG. 3 is a top plan view of the frame cross member with the hitch assembly secured thereto.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to FIG. 1, an improved hitch assembly 41 is shown adapted for installation on a Dodge® or Ram® truck frame incorporating a frame cross member 10 after the truck bed 11 is installed and without having to remove the truck bed 11. Hitch assembly 41 includes a main body or support member 43 formed as a C-channel member having a central web 45 extending between front and rear depending legs or side walls 47 and 48. The central web 45 and front and rear side walls 47 and 48 are sized slightly narrower than the side walls 17 and 18 of the channel member 16 forming frame cross member 10 to permit the main body 43 of the hitch assembly 41 to be positioned between side walls 17 and 18 when the central web 45 of hitch assembly 41 is positioned below the central support panel 22 of cross-member 10.

Figure 6:
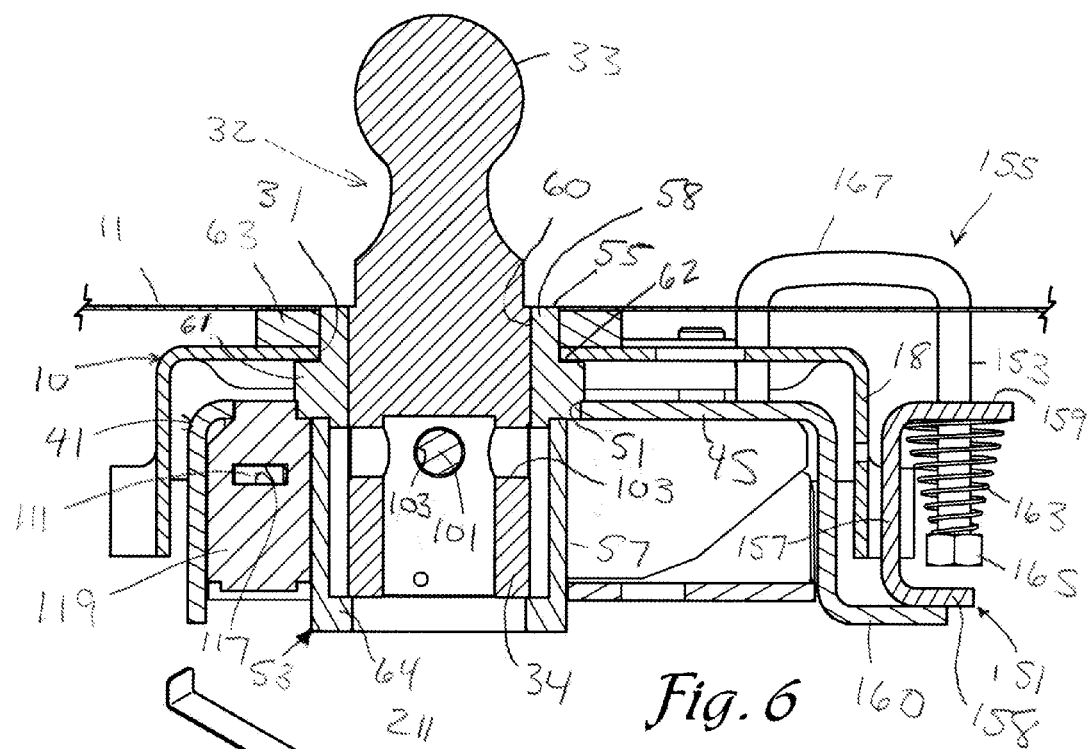
FIG. 6 is an enlarged and fragmentary cross-sectional view taken along line 6-6 of FIG. 3.

A hole 51 sized to receive the base of a hitch member 32 therein extends through the central web 45. A retention sleeve or socket 53 with an open upper end 55 is positioned within hole 51 in the central web 45 and welded thereto with the open upper end 55 projecting upward. The retention sleeve 53 includes a lower portion 57 and an upper portion 58. The lower portion 57 may be formed as a cylindrical sleeve with inner and outer cylindrical walls which are sized to extend through the hole 51 in the central web 45. A central passage 60 through the upper section 58 preferably is formed square in cross-section with rounded corners. The upper and lower portions 58 and 57 are welded together and to the central web 45 where they butt together. A circumferential flange 61 projects radially outward from the upper section 58 and abuts an upper surface of the central web 45. A shoulder 62 is formed between the circumferential flange 61 and the portion of the upper section 58 extending thereabove. The shoulder 62 abuts a lower surface of the central support panel 22 of the web 20 of frame cross-member 10 when the hitch assembly 41 is secured to the cross-member 10. The portion of the upper section 58 extending above the shoulder 62 is sized to extend up through the hitch member receiving hole 31 in the web 20 of cross-member 10 and into alignment with a hole cut in the truck bed floor 11 such that the upper open end 55 of the retention sleeve 53 extends generally flush with the truck bed floor 11. A spacer 63 comprising a sheet of polymeric material with a hole cut therethrough and sized to fit around the upper section 58 of the retention sleeve 53 is used to support the truck bed floor 11 above the web 20. As shown in FIG. 6, the spacer 63 is supported on top of the web 20 of frame cross-member 10 with the hole through the spacer 63 aligned with the hitch member receiving hole 31 in cross-member 10. The spacer 63 is inserted between the web 20 and the truck bed floor 11 prior to attachment of the hitch assembly 41 to the frame cross-member 10 with the spacer 63 filling the vertical space between the web 20 and truck bed floor 11. In the embodiment shown, spacer 63 has a square shape although other shapes, including round, may be utilized.

Although not shown in the drawings, the portion of the truck bed floor 11 directly above the hitch member receiving hole 31 in crossmember 10 is flattened and does not include stiffening ribs, to facilitate cutting a hole through the floor 11 aligned with the hitch member receiving hole 31 and through which the hitch member 32 may pass. The spacer 63 is preferably sized so that the width, diameter or outer dimensions of the spacer 63 generally correspond to the width, diameter or outer dimensions of the flattened area of the truck bed floor 11.

An inwardly projecting lip 64 is formed on an inner surface of the lower portion 57 of retention sleeve 53 surrounding a lower open end thereof. The bottom of the hitch ball base 34 rests on the lip 64 when the hitch member 32 is inserted in the sleeve 53 with the hitch ball head 33 projecting upward through a hole in the truck bed floor 11. The hitch member 32 may also be inserted into the sleeve 53 in an inverted orientation with the hitch ball head 33 oriented downwardly (not shown), and can be stored in this position when not in use, thereby leaving the truck bed unobstructed. When the orientation of the hitch member 32 is reversed and inserted in the sleeve 53 a shoulder of the hitch member 32 between the hitch ball head 33 and the hitch ball base 34 rests on the lip 64 with the hitch ball head 33 extending through the open lower end of the sleeve 53.

Two sets of three mounting holes or bolt holes 66 are formed in the web 45 of the body 43 of the hitch assembly 41. The spacing and angular orientation of each set of holes 66 corresponds to the spacing and angular orientation of the holes 36 in the frame cross member 10. Bolts 68 inserted through mounting holes 66 in hitch assembly 41 aligned with mounting holes 36 in cross member 10 are used to secure the hitch assembly 41 to the cross member 10. If the hitch assembly 41 is installed with the truck bed removed, conventional nuts can be used to secure the bolts 68 in place.

When the hitch assembly 41 is to be installed with the truck bed already secured to the truck frame over cross member 10, self-locating nut plates 71 and 72 are used to secure the bolts 68 in place. Each nut plate 71 and 72 comprises a bar 73 with generally flat upper and lower surfaces and three threaded bolt receivers 76 extending therethrough. The spacing and angular alignment of the threaded bolt receivers 76 corresponds to the spacing and angular alignment between mounting holes 36 and mounting holes 66 such that threaded bolt receivers 76 may be aligned with the holes 36 with which mounting holes 66 on hitch assembly 41 are also aligned. With bolt receivers 76 aligned with mounting holes 66 and 36, bolts 68 may be threaded up through the aligned holes 66 and 36 and into threaded receivers 76 to secure the hitch assembly 41 to the cross member 10.

Each nut plate 71 and 72 is sized with a relatively low profile to permit the nut plates 71 and 72 to be inserted in the gap formed between the truck bed floor 11 and the downwardly recessed outer mounting panels 23 and 24. A locating handle or bracket 78 is connected to and projects laterally outward relative to the nut plates 71 and 72. The handle 78 extends at an angle relative to a line drawn through centers of the bolt receivers in bar 73 that is complementary to the angle formed between a line drawn through the centers of one of the sets of aligned mounting holes 36 in cross member 10 with a line extending through the center of the hole 31 in cross member 10 and longitudinally relative to the truck frame. Therefore, when the nut plates 71 and 72 are inserted into the gap between the truck bed floor 11 and the downwardly recessed outer mounting panels 23 and 24 respectively using handle 78, holding the handle 78 generally perpendicular to a longitudinal axis through the truck frame orients the bar 72 so that bolt receivers 76 are angularly aligned with mounting holes 36 in the downwardly recessed outer support panels 23 and 24 of cross member 10. The length of the bar 72 generally corresponds to the width of the recessed portion of the cross member 10 to generally align the bolt receivers 76 with the mounting holes 36 longitudinally when the bar is inserted between the truck bed floor 11 and the recessed outer mounting panels 23 and 24.

A locating feature or flange 80 is formed on and projects downward from the handle 78. The flange 80 is sized for reception within a complementary feature or hole 82 formed on or in the cross member 10. The locating flange 80 is positioned on the handle 78 such that when the locating flange 80 is inserted in hole 82 the bolt receivers 76 in the bar 72 are located or positioned over and in general alignment with the mounting holes 36 in cross-member 10. The downwardly projecting flange 80 has a length that closely approximates the diameter of the hole 82 in which it is received to hold the bar 72 in the proper spacing with the bolt receivers 76 extending in alignment over the mounting holes 36 on cross member 10. Engagement of the cross member 10 by the flange 80 extending in complementary hole 82 also prevents the bar 72 from rotating as the first bolt 68 inserted through mounting holes 66 and 36 is threaded into the aligned bolt receiver 76. The locating feature 80 thereby maintains the alignment of the bolt receivers 76 over mounting holes 36 as the hitch assembly 41 is bolted to the cross member 10.

The nut plates 71 and 72 and associated handles 78 are configured as mirror images of one other to accommodate the opposite angles at which the two sets of mounting holes 36 extend relative to the longitudinal axis through the hole 51 in cross member 10. It is to be understood that the number of mounting holes 36 in each set of holes in the cross member 10 and hitch assembly 41 could vary although it is preferred that each set of holes includes at least two holes. The number of mounting holes 66 in hitch assembly 41 and in the nut plates 71 and 72 generally corresponds with the number of mounting holes in cross member 10.

Figure 4:
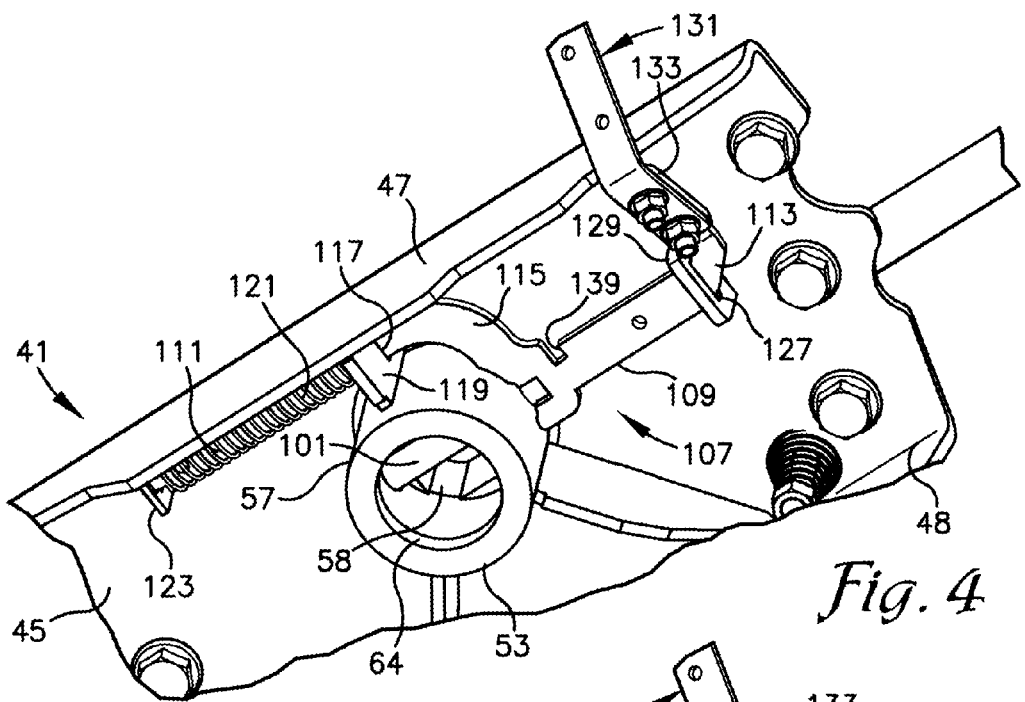
FIG. 4 is a fragmentary bottom perspective view of the hitch assembly showing a latch assembly in a latched position.
Figure 5:
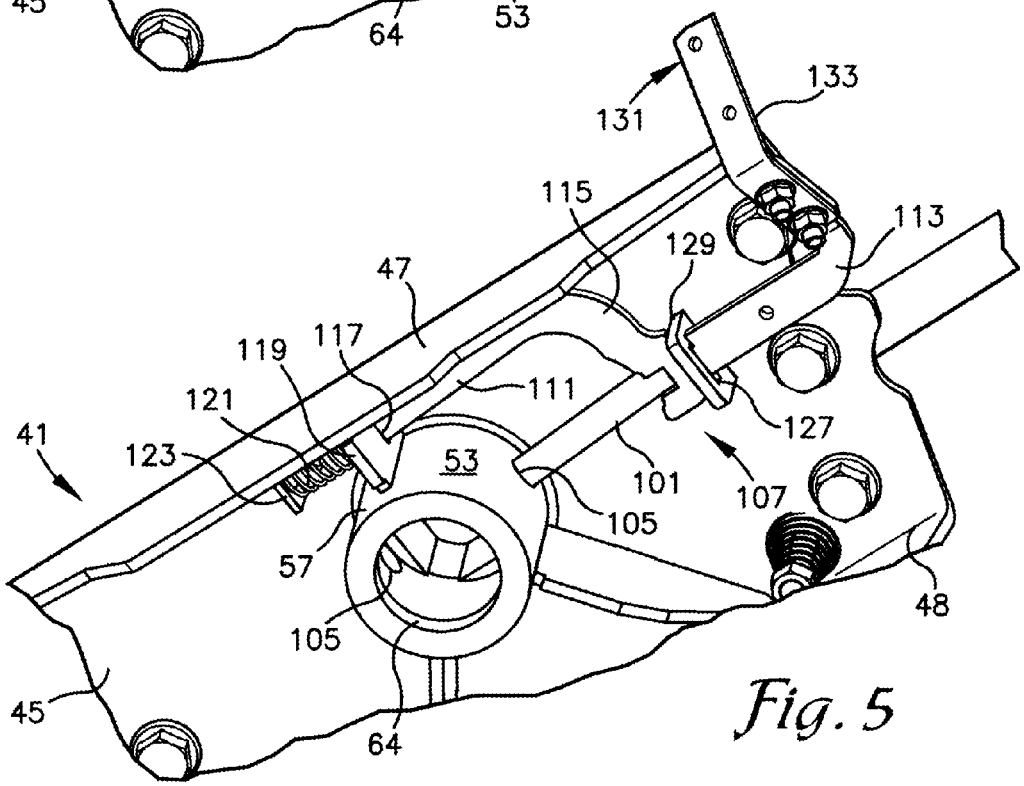
FIG. 5 is a view similar to FIG. 4 showing the latch assembly in an unlatched position.

As best seen in FIGS. 4 through 6, the hitch member 32 is held in the retention sleeve 53 by a spring biased latch pin 101. A latch pin receiver 103 is formed in the hitch ball base 34 perpendicular to a vertical axis of the hitch member 32. A latch pin passageway 105 is formed through the lower portion 57 of the retention sleeve 53 and is positioned to extend in alignment with the latch pin receiver 103 when the hitch member 32 is inserted in the retention sleeve 53 in either an upright or inverted orientation. In the embodiment shown, the hitch ball base 34 is generally square in cross-section with rounded corners to mate with the geometry of the upper portion 58 of retention sleeve 53 to prevent rotation of hitch member 32 relative to sleeve 53. Two latch pin receivers 103 are formed through the hitch ball base 34, perpendicular to one another, so that one of the latch pin receivers 103 will be aligned with the latch pin passageway 105 in the retention sleeve 53 in any of the four mating orientations of the hitch member 32 relative to retention sleeve 53 about the vertical axis.

The latch pin 101 is mounted on a latch pin linkage 107 and operably advanceable between a latched or engaged position in which the pin 101 extends through latch pin passageway 105 and into latch pin receiver 103 in the hitch ball base 34 and a released or disengaged position where the latch pin 101 is withdrawn from the latch pin receiver 103 and the hitch member 32 is freely removable from the retention sleeve 53. In a preferred embodiment the latch pin passageway 105 extends through opposite sides of the retention sleeve 53, the latch pin receiver 103 extends completely through the hitch ball base 34 and the latch pin 101 is sized to extend completely through the latch pin receiver 103 and the latch pin passageway 105 in the sleeve 53 on opposite sides of the hitch ball base 34.

The latch pin linkage 107 includes a latch pin stem 109 extending generally in axial alignment with the latch pin 101 and an actuator arm 111 extending in generally parallel, spaced relation to the latch pin 101. Alternatively, the actuator arm 111 may extend in spaced relation and at a small or slight acute angle relative to the latch pin 101 with the angle diverging away from a distal end 113 of the latch pin stem 109. The latch pin stem 109 may be considered part of the latch pin 101. The actuator arm 111 is connected to the latch pin stem 109 by a lever arm 115. The actuator arm 111 may be described as extending generally tangential to the retention sleeve 53.

The actuator arm 111 is slidably mounted in a slot 117 formed in an actuator arm mount 119 projecting downward from the central web 45 of hitch assembly 41. A compression spring 121 surrounds the actuator arm 111 and extends between the actuator arm mount 119 and a spring keeper 123 secured to a distal end of the actuator arm 111 opposite the lever arm 115. The distal end of the actuator arm 111 extends past the actuator arm mount 119 on a side of the mount 119 opposite the latch pin stem 109. The spring keeper 123 may be formed from a slotted plate which can be inserted over the distal end of the actuator arm 111 and into alignment with grooves formed on the distal end of the actuator arm 111 and then rotated ninety degrees so that flanges formed on the distal end of the actuator arm 111 by the grooves therein hold the keeper 123 in place on the arm 111 against the biasing force of the spring 121. The biasing force of the spring 121 normally biases the distal end of the actuator arm 111 away from actuator arm mount 119 urging the latch pin 101 to the latched position.

The latch pin stem 109 extends through a slot 127 formed in a mounting tab or flange 129 projecting downward from the central web 45 of hitch assembly 41. A latch pin handle or draw bar 131 is connected to the distal end 113 of the latch pin stem 109 on a side of the mounting tab 129 opposite the lever arm 115. The latch pin handle 131 shown includes a longitudinally extending leg 133 extending generally transverse to the latch pin stem 109 and longitudinally relative to the truck frame to which the hitch assembly 41 is mounted and a laterally extending leg 135 extending generally parallel to the latch pin stem 109 and laterally to one side of the truck frame to which the hitch assembly 41 is mounted. When the hitch assembly 41 is mounted to the cross member 10, a downwardly turned grip 137 formed on the outer end of the handle 131 is positioned in the wheel well for manual access by a user. Pulling laterally outward on the latch pin handle 131 relative to the truck frame, pulls or draws the latch pin 101 to the disengaged position against the biasing force of the spring 121 as the spring is compressed between the spring keeper 123 and the actuator arm mount 119.

The length of the latch pin stem 109 extending from the lever arm 115 to the mounting tab 129 when the latch pin 101 is in the latched or engaged position closely approximates the length of the latch pin 101 extending past the portion of the latch pin passageway 105 closest to the latch pin stem 109 (the first side of the passageway), through the latch pin receiver 103 in hitch ball base 34 and through the portion of the latch pin passageway 105 opposite the latch pin stem 109 (the second side of the passageway). The latch pin stem 109 is therefore long enough to completely withdraw the latch pin 101 from the latch pin receiver 103 when the latch pin is pulled to the disengaged position using handle 125.

A notch 139 is formed in the latch pin stem 109 adjacent the point at which the lever arm 115 projects outward therefrom. The notch 139 is slightly wider than the thickness of the mounting tab 129. The notch 139 opens in the same direction that the lever arm 115 projects outward from the latch pin stem 109. When latch pin stem 109 is pulled through the slot 127 in the mounting tab 129 far enough that the lever arm 115 abuts the mounting tab 129, the notch 139 is advanced into alignment with the mounting tab 129. The biasing force of the spring 121 acting through the lever arm 115 creates a moment which urges the latch pin stem 109 laterally relative to the mounting tab 129 (longitudinally relative to the truck frame) such that the notch advances over a portion of the mounting tab 129. Extension of a portion of the mounting tab 129 into notch 139 prevents advancement of the latch pin 101 back to the latched position under the biasing force of the spring 121 until the latch pin stem 109 is manually pivoted in an opposite direction away from portion of the mounting tab 129 received within the notch 139. The notch 139 and mounting tab 129 cooperatively form a catch.

The moment created by the biasing force of the spring 121 acting through the lever arm 115 causes the latch pin 101 and axially aligned latch pin stem 109 to pivot at the point at which the tip or distal end of the latch pin 101 engages the retention sleeve 53 surrounding the latch pin passageway 105 on the first side thereof. The latch pin passageway 105 on at least the first side thereof is sized slightly larger than the latch pin 101 to permit the pin 101 to pivot relative thereto. Similarly, the slot 117 in actuator arm mount 119 is sized slightly wider than the actuator arm to permit the actuator arm 111 to slide or pivot relative thereto.

A safety chain anchor mount or flanged bracket 151 is secured to the main body 43 of the hitch assembly 41 to provide structure to which one leg 153 of safety chain anchors 155 may be secured. In the embodiment shown, the safety chain anchors 155 comprise U-bolts, but it is foreseen that safety chain anchors of other configurations could be utilized including but not limited to eye-bolts. The flanged bracket 151 is generally formed from a C shaped channel and includes a sidewall 157, an outwardly projecting bottom flange 158 and an outwardly projecting upper flange 159. The bracket 151 is welded at a lower end to a foot 160 projecting rearward from a lower end of the rear leg or flange 48 of the hitch member main body 43. The bracket sidewall 157 extends in spaced relation to the rear leg 48 so that the rear leg or flange 18 of cross member 10 extends into the space, gap or channel formed therebetween when the hitch assembly 41 is bolted to the cross member 10. When the hitch assembly 41 is bolted to cross member 10, the outwardly projecting flange 159 extends in relatively closely spaced relation below the truck bed floor 11.

Two sets of safety chain anchor receiving holes 161 are formed in the hitch assembly 41. One hole 161a in each set is formed through the flange 159 and a second hole 161b in each set is formed through the web 45. Once the hitch assembly 41 is bolted in place, an installer can drill holes through the portion of the web 45 of cross member 10 and the truck bed floor 11 in alignment with and above each hole 161b and through the portion of the tuck bed floor 11 in alignment with and above hole 161a. Holes 162 drilled through the web 45 of cross member 10 are shown in FIG. 1. The legs 153 of safety chain anchor 155 may then be inserted through the a set of holes bored through the truck bed floor 11, cross member 10 and through aligned holes 161 with compression springs 163 positioned around the lower ends of the legs 153 and held in place by nuts 165. The springs 163 normally draw the cross bar 167 of the U-bolts 155 downward against or in closely spaced relation above the truck bed floor 11. Safety chains are removably couplable to the safety chain anchors 155 to secure the trailer to the truck bed in case the gooseneck comes uncoupled from the hitch ball head 33. An operator pulls the cross bar or bail 167 of the U-bolt forming safety chain anchor 155 upward, against the biasing force of the springs to provide space to connect a hook on an end of a safety chain thereto.

Providing structure spaced from the hitch member main body in which at least one of the safety chain anchor receiving holes 161 may be formed, permits securing of the safety chain anchors at a spacing from the hitch member 32 which is far enough away to prevent interference with a gooseneck attached thereto, but close enough to prevent the trailer from moving to far rearward if it inadvertently comes uncoupled from the hitch member 32. A spacing of approximately ten inches has been found to provide the desired clearance for most gooseneck hitches.

Figure 7:
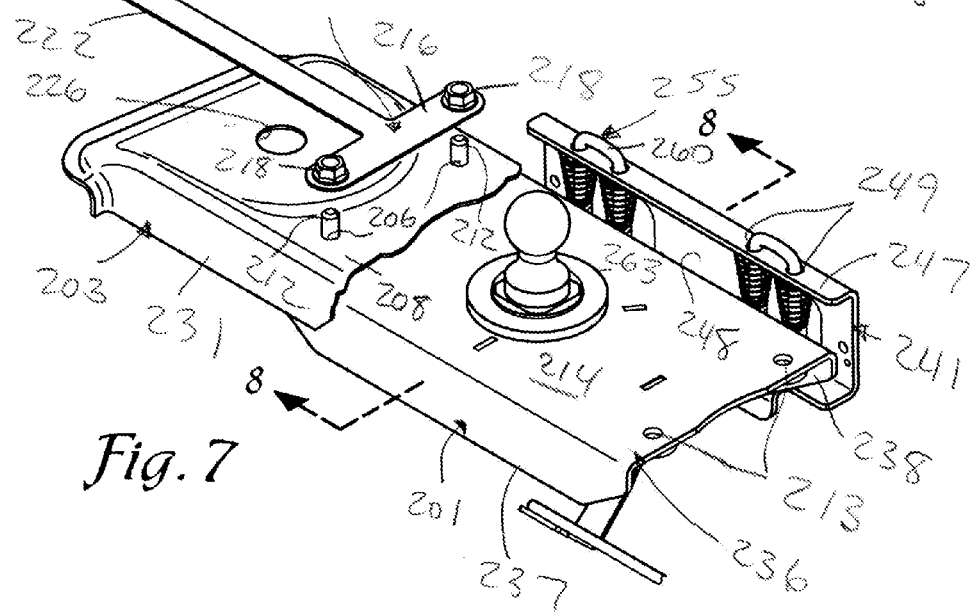
FIG. 7 is fragmentary and exploded perspective view of an alternative embodiment of a hitch assembly secured to an alternative frame cross member of a truck.
Figure 8:
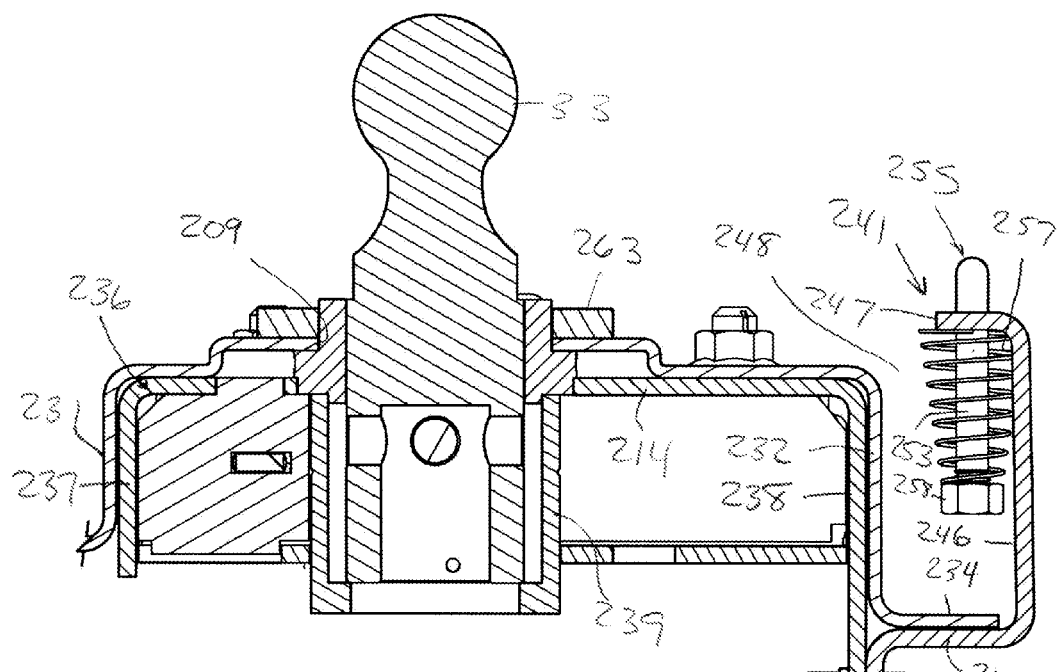
FIG. 8 is an enlarged and fragmentary cross-sectional view taken along line 8-8 of FIG. 7.
Figure 9:
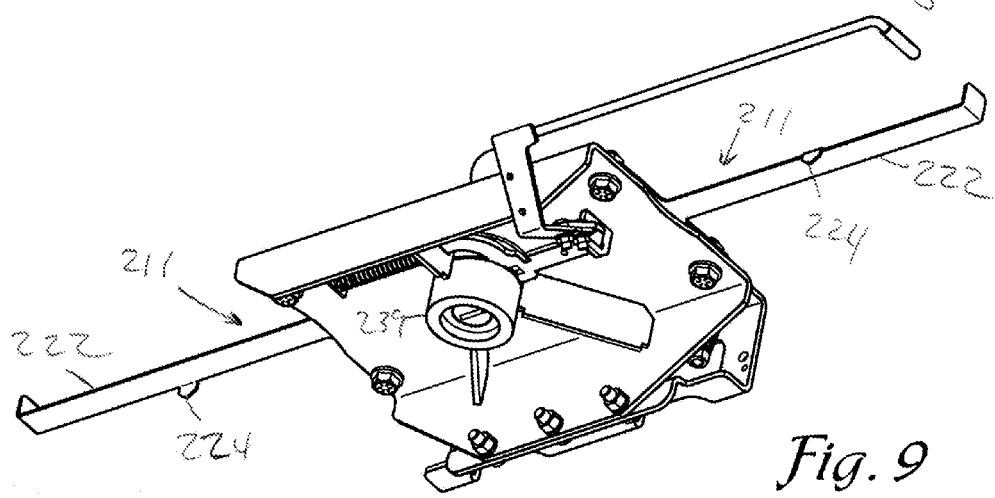
FIG. 9 is a bottom, perspective view of the alternative embodiment of the hitch assembly as shown in FIG. 7.

Referring to FIGS. 7 through 9, an alternative embodiment of a hitch assembly 201 is shown installed on a modified version of an integral cross member 203 of a truck frame. In the alternative cross member 203, only two mounting holes 206 are formed in the web 208 on opposite sides of the hitch member receiving hole 209. Each pair of mounting holes 206 generally extends in axial alignment on an axis extending transverse to a longitudinal axis of the cross member 203 or parallel to a longitudinal axis of the truck frame. Nut plates or screw receiving brackets 211 are provided for receiving bolts 212 inserted through bolt holes 213 in a web 214 of hitch assembly 201 and through the aligned mounting holes 206 in the web 208 of cross member 203.

Each nut plate 211 comprises a bar 216 with generally flat upper and lower surfaces and two holes extending therethrough with a nut 218 welded to the upper surface with a threaded bore through each nut 218 aligned with and over a respective hole in bar 216. The spacing of the threaded holes through the nuts 218 corresponds to the spacing between mounting holes 206 in cross member 203 and through holes 213 in web 214 such that the threaded nuts 218 may be aligned with the holes 206 and 213 through the cross member 203 and web 214 of hitch assembly 201. With nuts 218 aligned with mounting holes 206 and 213, bolts 212 may be threaded up through the aligned holes 206 and 213 and into threaded nuts 218 to secure the hitch assembly 201 to the cross member 203.

Each nut plate 211 in combination with the nuts 218 secured thereto is sized with a relatively low profile to permit the nut plates 211 and associated nuts 218 to be inserted in the gap formed between the truck bed floor 11 and the portion of the cross-member 203 in which the mounting holes 206 are formed. A locating handle 222 is connected to and projects laterally outward relative to each nut plate 211. In the embodiment shown in FIGS. 7 and 9, the handle 222 extends perpendicular to a line drawn through centers of the nuts 218.

A locating feature or flange 224 is formed on and projects downward from the handle 222 projecting from each nut plate 211. The flange 224 is sized for reception within a complementary feature or hole 226 formed on or in the cross member 203. The locating flange 224 is positioned on the handle 222 such that when the locating flange 224 is inserted in hole 226 the bolt receiving nuts 218 are located or positioned over and in general alignment with the mounting holes 206 in cross-member 203. The downwardly projecting flange 224 has a length that closely approximates the diameter of the hole 226 in which it is received to hold the nut plate 211 in the proper spacing with the nuts 218 extending in alignment over the mounting holes 206 on cross member 203. Engagement of the cross member 203 by the flange 224 extending in complementary hole 226 also prevents the nut plate 211 from rotating as the first bolt 212 inserted through mounting holes 206 and 213 is threaded into the aligned nut 218. The locating feature 224 thereby maintains the alignment of the nuts 218 over mounting holes 206 as the hitch assembly 201 is bolted to the cross member 203.

Cross-member 203 includes depending front and rear legs or flanges 231 and 232. An outwardly projecting flange or foot 234 is formed on a lower end of rear leg 232. The hitch assembly 201 includes a main body 236 formed by web 214 with depending legs or flanges 237 and 238 and a hitch member receiving socket 239 connected to and extending through web 214. A safety chain anchor mount or flanged bracket 241 is bolted to the rear depending leg 238 of the hitch assembly main body 236. The flanged bracket 241 includes a base with a downwardly projecting lip 243 formed along a lower edge thereof for bolting to a lower end of rear depending leg 238. A bottom wall 245 of flanged bracket 241 projects rearward from lip 243 and a rear wall 246 projects upward from the bottom wall 245. A forwardly or inwardly directed flange 247 is formed on an upper end of rear wall 246 and projects forward towards the main body 236 of hitch assembly 201.

Forwardly directed flange or support member 247 extends in spaced relation to the rear depending leg 238 of the hitch assembly main body 236 along substantially its entire length forming a gap 248 therebetween. Two pairs of holes 249 adapted to receive legs of 253 of U-bolt type safety chain anchors 255 are formed in and through flange 247 with one pair positioned on each side of the socket 239 in a lateral direction relative to the truck frame to which the hitch assembly 201 is mounted. In the embodiment shown in FIGS. 7-9 both holes 249 in each pair are formed in the flange 247 of flanged bracket 241 to receive both legs 253 of each U-bolt 255 therein. The pairs of holes 249 extend in alignment along an axis extending in parallel and rearward spaced relationship to a longitudinal axis of the hitch assembly main body 236 running through the socket 239. Compression springs 257 positioned around the lower ends of the legs 253 and held in place with nuts 258 secured on lower ends of the legs 253 normally draw the cross bar 260 of each U-bolt 255 downward against the truck bed floor 11. Safety chains are removably couplable to the U-bolts 255 to secure the trailer to the truck bed in case the gooseneck comes uncoupled from the hitch ball head 33.

The gap 248 between the flange 247 and the main body is sized to allow the rear depending leg 232 of the cross-member 203 to pass therethrough. In an embodiment of the hitch assembly 201 as shown in FIGS. 7-9, the flanged bracket 241 is bolted to the rear leg 238 of main body 236 after the main body is secured to the cross member 203 with the foot 234 of rear depending leg 232 extending into the space between the rear leg of the main body 236 and the rear wall 246.

Referring to FIGS. 7 and 8, an annular spacer 263, similar to spacer 63, is provided for supporting the truck bed floor 11 above the cross-member 203. Annular spacer 263 is shown as round.

Figure 10:
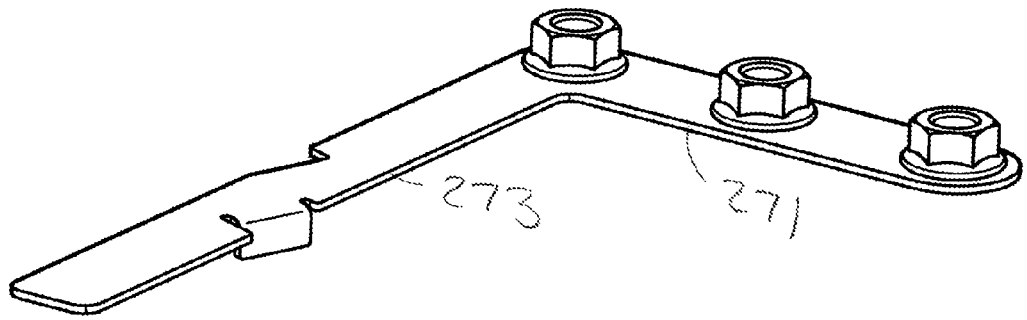
FIG. 10 is a perspective view of an alternative nut plate assembly for use with the hitch assembly as shown in FIG. 1.
Figure 11:
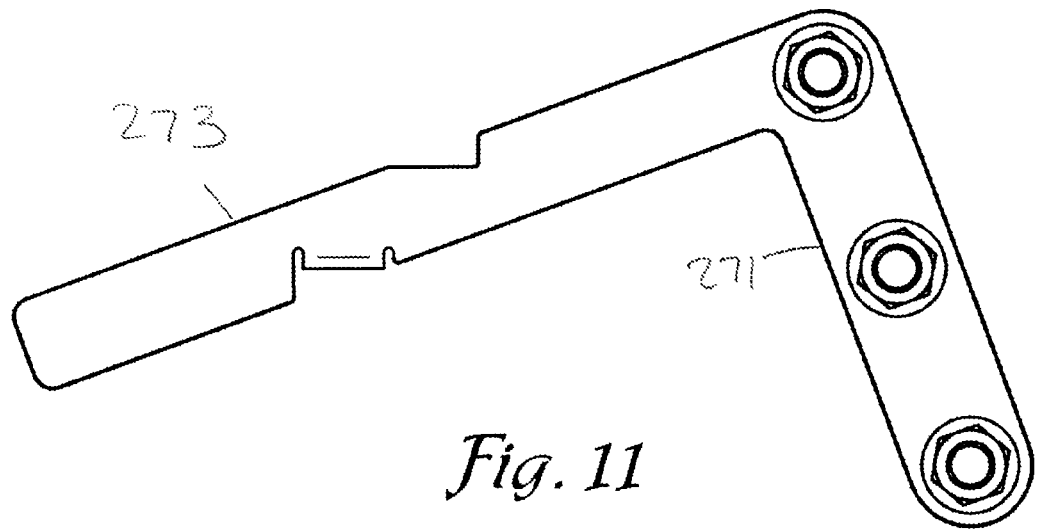
FIG. 11 is a top plan view of the alternative nut plate assembly of FIG. 10.

FIG. 10 shows an alternative embodiment of a nut plate 271 with a handle 273 projecting outward from one end of the nut plate 271 to form an L-shaped nut plate assembly. The L-shaped nut plate assembly as shown in FIG. 10 is particularly well adapted for use with the cross-member 10 as shown in FIG. 1 in which the sets of mounting holes 36 are aligned on an axis extending at an angle relative to a longitudinal axis of the truck frame extending through the hitch member receiving hole 31.

It is to be understood that while certain forms of the present invention have been illustrated and described herein, it is not to be limited to the specific forms or arrangement of parts described and shown. As used in the claims, identification of an element with an indefinite article "a" or "an" or the phrase "at least one" is intended to cover any device assembly including one or more of the elements at issue. Similarly, references to first and second elements is not intended to limit the claims to such assemblies including only two of the elements, but rather is intended to cover two or more of the elements at issue. Only where limiting language such as "a single" or "only one" with reference to an element, is the language intended to be limited to one of the elements specified, or any other similarly limited number of elements.

What is claimed and desired to be secured by Letters Patent is as follows:

1. A trailer hitch assembly for use in a vehicle having a bed floor and a frame having a cross member closely spaced below the bed floor, the cross member including a pair of spaced apart and downwardly extending sidewalls and an interconnecting web, the interconnecting web including a central support panel and first and second downwardly recessed outer support panels formed on opposite sides of the central support panel, the central support panel having a hitch ball opening extending therethrough and the outer support panels each having a plurality of first mounting holes formed therethrough, the trailer hitch assembly comprising:

a hitch body positionable below the interconnecting web of the cross member and between the pair of sidewalls, said hitch body including a socket for receiving a hitch ball, said socket aligned with the hitch ball opening through the central support panel when said hitch body is secured to the cross member, said hitch body having a plurality of second mounting holes formed therethrough, each of said second mounting holes positioned to be aligned with a respective one of said first mounting holes in said cross member;

first and second nut plates, each sized to be inserted between the bed floor and a respective one of the first and second downwardly recessed outer support panels of the cross member and including a plurality of threaded bolt receivers, each of said threaded bolt receivers spaced and aligned on the respective nut plate to be aligned with a respective one of said first mounting holes in said cross member, wherein each of said first and second nut plates includes a locating feature positioned to engage a preselected feature of the respective first or second downwardly recessed outer support panels of the cross-member in order to position said threaded bolt receivers in alignment with the respective first mounting holes; and a plurality of threaded fasteners, each of said threaded fasteners receivable through a respective one of said second mounting holes and the respective one of said first mounting holes and threadably engagable with the respective threaded bolt receiver, wherein said preselected feature of each of said first and second downwardly recessed support panels comprises a locator hole formed therethrough and each of said first and second nut plates includes an arm extending outwardly therefrom and said locating feature is positioned on said arm and projects downward therefrom for reception within said locator hole in said respective first and second downwardly recessed support panels.

2. The trailer hitch assembly as in claim 1 wherein engagement of said locating feature on said arm of said first or second nut plate with the preselected feature of the respective first or second downwardly recessed support panel of the cross member further acts to resist a torque applied to tighten one of said threaded fasteners in order to inhibit said nut plate from rotating along with said one threaded fastener.

3. The trailer hitch assembly as in claim 1 and further including a hitch ball selectively received in said socket, said hitch ball including a base having a latch pin receiver formed therethrough, said latch pin receiver positioned for alignment with a passageway in said socket, said latch pin receiver and said passageway slidably receiving a latch pin moveable between an engaged position wherein said hitch ball is retained in said socket and a disengaged position where said hitch ball is freely removable from said socket.

4. The trailer hitch assembly as in claim 1 wherein an upper portion of said socket extends above an upper surface of said central web and said assembly further includes a support pad having an opening formed therein sized to receive the upper portion of said socket such that the support pad is positionable around the upper portion of said socket and said support pad is sized to extend vertically between the central web of the cross member and the bed floor.

5. A trailer hitch assembly for use in a vehicle having a bed floor and a frame having a cross member closely spaced below the bed floor, the cross member including a pair of spaced apart and downwardly extending sidewalls and an interconnecting web, the interconnecting web including a central support panel and first and second downwardly recessed outer support panels formed on opposite sides of the central support panel, the central support panel having a hitch ball opening extending therethrough and the outer support panels each having a plurality of first mounting holes formed therethrough, the trailer hitch assembly comprising:

a hitch body positionable below the interconnecting web of the cross member and between the pair of sidewalls, said hitch body including a socket for receiving a hitch ball, said socket aligned with the hitch ball opening through the central support panel when said hitch body is secured to the cross member, said hitch body having a plurality of second mounting holes formed therethrough, each of said second mounting holes positioned to be aligned with a respective one of said first mounting holes in said cross member;

first and second nut plates, each sized to be inserted between the bed floor and a respective one of the first and second downwardly recessed outer support panels of the cross member and including a plurality of threaded bolt receivers, each of said threaded bolt receivers spaced and aligned on the respective nut plate to be aligned with a respective one of said first mounting holes in said cross member, wherein each of said first and second nut plates includes a locating feature positioned to engage a preselected feature of the respective first or second downwardly recessed outer support panels of the cross-member in order to position said threaded bolt receivers in alignment with the respective first mounting holes;

a plurality of threaded fasteners, each of said threaded fasteners receivable through a respective one of said second mounting holes and the respective one of said first mounting holes and threadably engagable with the respective threaded bolt receiver; and a hitch ball selectively received in said socket, said hitch ball including a base having a latch pin receiver formed therethrough, said latch pin receiver positioned for alignment with a passageway in said socket, said latch pin receiver and said passageway slidably receiving a latch pin moveable between an engaged position wherein said hitch ball is retained in said socket and a disengaged position where said hitch ball is freely removable from said socket, wherein said latch pin is connected to a latch pin linkage including an actuator arm positioned parallel to and spaced apart from said latch pin and a spring connected to said actuator arm, said spring urging said latch pin toward said engaged position.

6. The trailer hitch assembly as in claim 5 wherein said spring is a compression spring surrounding said actuator arm and captured between a stop fixed to said hitch body and a retainer secured to said actuator arm.

7. The trailer hitch assembly as in claim 5 and further including a lever arm connecting said actuator arm to said latch pin.

8. The trailer hitch assembly as in claim 7 wherein said latch pin linkage further includes a handle mount in alignment with said latch pin and a handle connected to said handle mount for drawing said latch pin toward said disengaged position against the urging of said spring.

9. The trailer hitch assembly as in claim 8 wherein said latch pin linkage includes a catch for retaining said latch pin in said disengaged position.

10. The trailer hitch assembly as in claim 9 wherein said catch includes a notch formed in said handle mount and a stop fixed to said hitch body, said stop including a flange receivable within said notch when said latch pin is advanced to said disengaged position.

11. The trailer hitch assembly as in claim 10 wherein said notch has an open side oriented in a direction facing toward said actuator arm such that a force created by said spring acts through said lever arm to create a moment urging said notch laterally toward said flange.

12. The trailer hitch assembly as in claim 5 wherein an upper portion of said socket extends above an upper surface of said central web and said assembly further includes a support pad having an opening formed therein sized to receive the upper portion of said socket such that the support pad is positionable around the upper portion of said socket and said support pad is sized to extend vertically between the central web of the cross member and the bed floor.

* * * * *